United States Patent
Zhu

(10) Patent No.: US 7,215,342 B2
(45) Date of Patent: May 8, 2007

(54) SYSTEM AND METHOD FOR DETECTING AND CONVERTING A TRANSPARENCY SIMULATION EFFECT

(75) Inventor: Wei Zhu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 10/835,569

(22) Filed: Apr. 30, 2004

(65) Prior Publication Data

US 2005/0246145 A1     Nov. 3, 2005

(51) Int. Cl.
*G09G 5/02*     (2006.01)
(52) U.S. Cl. .................. 345/592; 345/594; 345/600
(58) Field of Classification Search ............. 345/592, 345/594, 600
See application file for complete search history.

(56) References Cited

U.S. PATENT DOCUMENTS

| 6,603,482 | B1 * | 8/2003 | Tidwell | ............... 345/592 |
| 2005/0192788 | A1 * | 9/2005 | Hobson | ............... 703/22 |

* cited by examiner

*Primary Examiner*—Matthew C. Bella
*Assistant Examiner*—Mike Rahmjoo
(74) *Attorney, Agent, or Firm*—Shook, Hardy & Bacon, L.L.P.

(57) ABSTRACT

A method and system are provided for detecting transparency simulation formulated by an application in a rendering device. The system includes a node structure construction component for saving each drawing function in a node with an associated node type and node state. The system further includes a node structure constructed from the saved nodes and traversal components for traversing the node structure. The traversal components include a type check mechanism for determining a saved type of each node in the structure and a state check mechanism for finding a saved state. The system detects the transparency simulation upon finding a predetermined node type and a predetermined node state.

20 Claims, 11 Drawing Sheets

SYSTEM AND METHOD FOR DETECTING AND CONVERTING A TRANSPARENCY SIMULATION EFFECT

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to providing a transparency effect for a user interface. More particularly, embodiments of the invention relate to the detection of a transparency simulation and conversion to a true transparency.

BACKGROUND OF THE INVENTION

It is often desirable to provide a user with an image having portions that appear to be transparent. Microsoft Windows, a product of the Microsoft Corporation of Redmond, Wash., includes graphics device interface (GDI) application program interfaces (APIs) that lack some basic transparency supports. For example, the APIs offer no support for opacity in a brush, which is the graphics tool that applications use to paint the interiors of various shapes. In order to overcome this deficiency, applications such as Microsoft Office XP, Microsoft Office 2003, and Microsoft GDI+ simulate the transparency effects by using a combination of read only printer codes (ROPs) when printing to a printer.

While these simulations may appear to accurately portray a transparency effect in a single on-screen view, they often lose the desired appearance in zoomed views. Furthermore, the simulations are not device-independent and therefore often cannot be printed as rendered for viewing by a user.

More efficient techniques have been formulated for creating transparency effects. However, these techniques are not currently universally implemented and many existing applications continue to use the transparency simulations described above that cannot be consistently accurately rendered. Accordingly, it is necessary to detect whether a transparency has been simulated in order to subsequently correct the simulation with a transparency effect that will be efficiently replicated in multiple views and by multiple printers or other output devices.

Accordingly, a solution is needed for detecting simulation effects in a printer or display driver. The detection of the simulation effects will enable correction in order to prevent inaccurate rendering of transparency effects.

BRIEF SUMMARY OF THE INVENTION

Embodiments of the present invention are directed to a method for system for detecting transparency simulation formulated by an application in a rendering device such as a printer driver or display. The system includes a node structure construction component for saving each drawing function in a node with an associated node type and node state. The system additionally includes a node structure constructed from the saved nodes and traversal components for traversing the node structure. The traversal components determine a saved type and state of each node in the structure and detect the transparency simulation upon finding a predetermined node type and predetermined node state.

In another aspect of the invention, a method is provided for detecting a transparency simulation in a rendering device, such as a printer driver or display. The transparency simulated has been formulated by an application. The method includes saving each drawing function in a node with an associated node type and node state and constructing a node structure from the saved nodes. The method additionally includes traversing the node structure and determining the saved type of each node. The method additionally determines a saved state if a predetermined node type is found. The method further includes detecting the transparency simulation upon finding a predetermined node type and predetermined node state.

Upon detecting nodes of a specified type and state and an ending marker, the system and method perform a conversion process for converting the simulated transparency to a true transparency.

BRIEF DESCRIPTION OF THE DRAWINGS

The present invention is described in detail below with reference to the attached drawings figures, wherein.

DETAILED DESCRIPTION OF THE INVENTION

I. System Overview

Figure 1:
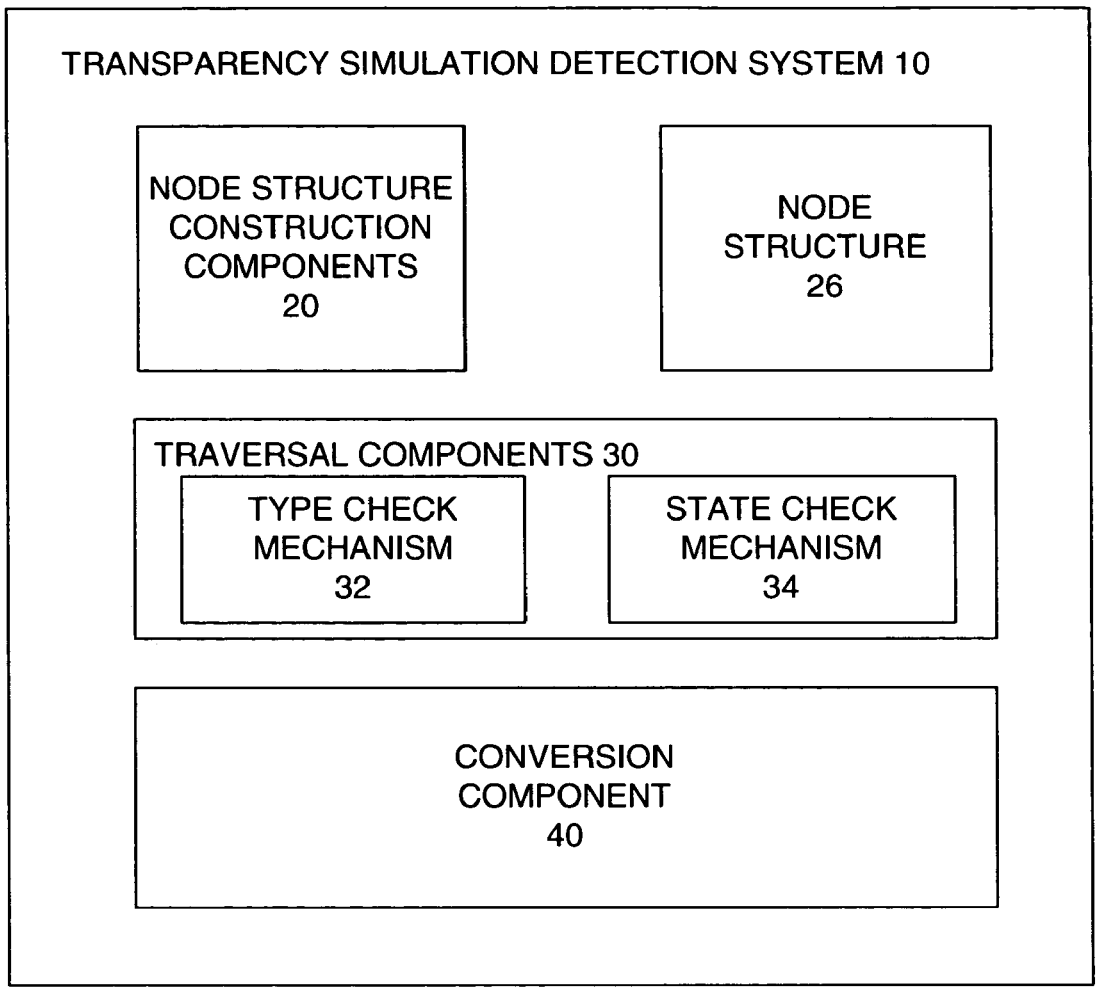
FIG. 1 is a block diagram illustrating a transparency simulation detection system in accordance with an embodiment of the invention.

Embodiments of the invention include a method and system for detecting and converting a transparency simulation in a printer driver or other device driver. FIG. 1 illustrates an embodiment of a system 10 for transparency simulation detection and conversion. The transparency simulation detection system 10 may include node structure construction components 20 and a resultant stored node structure 26. The system 10 may additionally include node traversal components 30. The traversal components 30 may include a type check mechanism 32 and a state check mechanism 34. The system 10 may additionally include a conversion component 40 for converting a simulated transparent path fill operation into a true transparent path fill.

In operation, in order to simulate transparency effects, independent applications route calls through the GDI. The GDI calls functions of the form "DrvXXX" that are implemented by display and/or printer drivers. In order to detect transparency simulations, the node structure construction components 20 save the states of the DrvXXX functions until the system 10 can determine whether a DrvXXX operation is part of a transparency simulation sequence. The node structure construction components 20 accordingly save the state of each DrvXXX operation in a node object and place each node object into a node structure 26 such as a queue, a list, or a tree structure.

After the node structure 26 is constructed, traversal components 30 traverse the node structure 26 and use the type check mechanism 32 and the state check mechanism 34 to detect a simulated transparency sequence. The conversion component 40 converts the detected simulation sequence into a true transparency. The process will be further described below in conjunction with the additional drawings and flowcharts.

II. Exemplary Operating Environment

Figure 2:
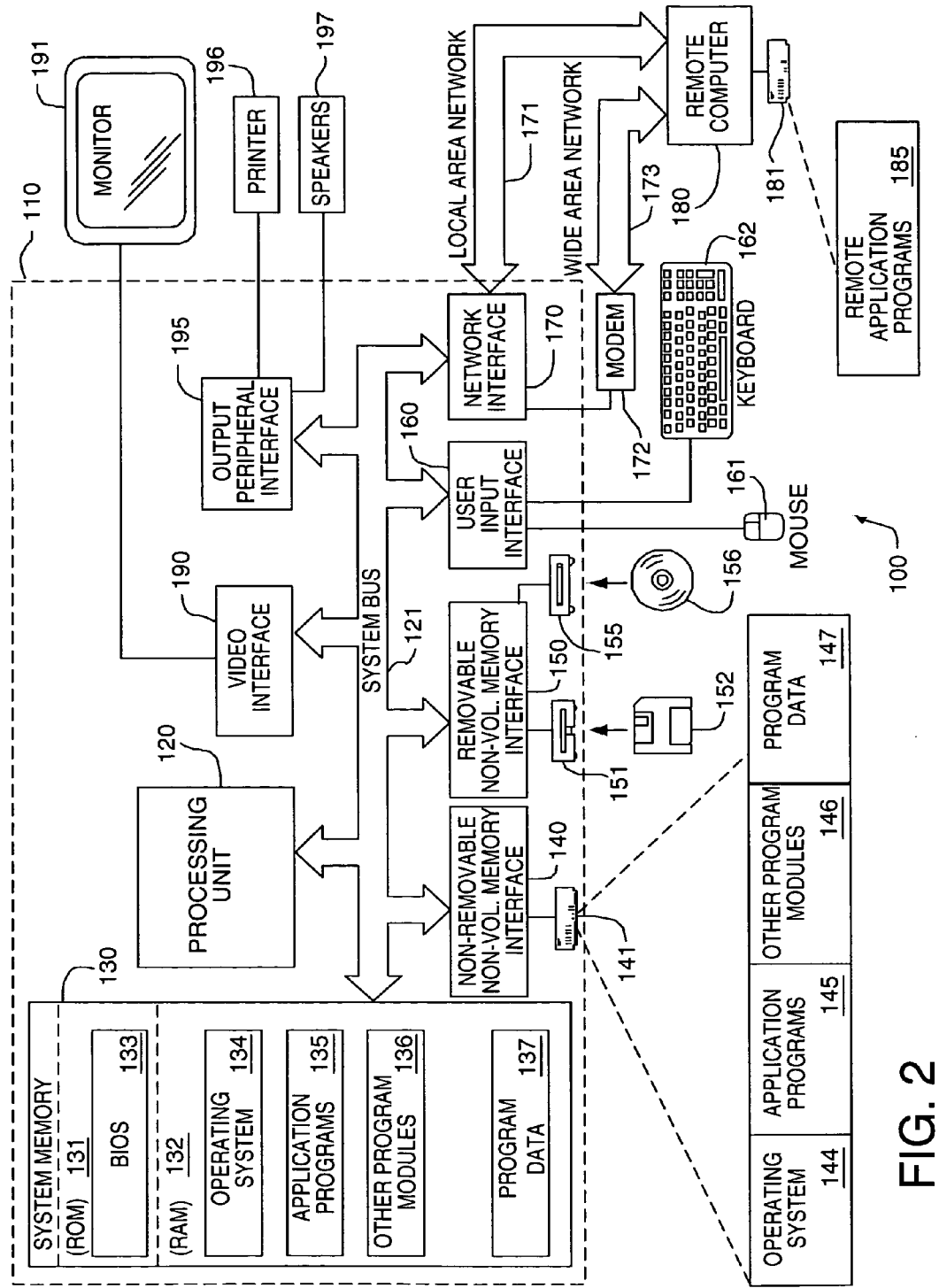
FIG. 2 is a block diagram illustrating a computerized environment in which the transparency simulation detection system may be implemented.

FIG. 2 illustrates an example of a suitable computing system environment 100 on which the transparency simulation detection system 10 may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137. The transparency simulation and detection system 10 may be stored in any of the aforementioned memory structures.

The computer 110 may also include other removable/nonremovable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. Transparency Simulation

An understanding of the process of simulation detection depends upon an understanding of the transparency simulation processes implemented by various applications. A filled shape refers to a closed shape that is filled through the use of a brush object. The brush object may be used to paint the interior of graphics shapes, such as rectangles, ellipses, pies, polygons, and paths.

Figure 3:
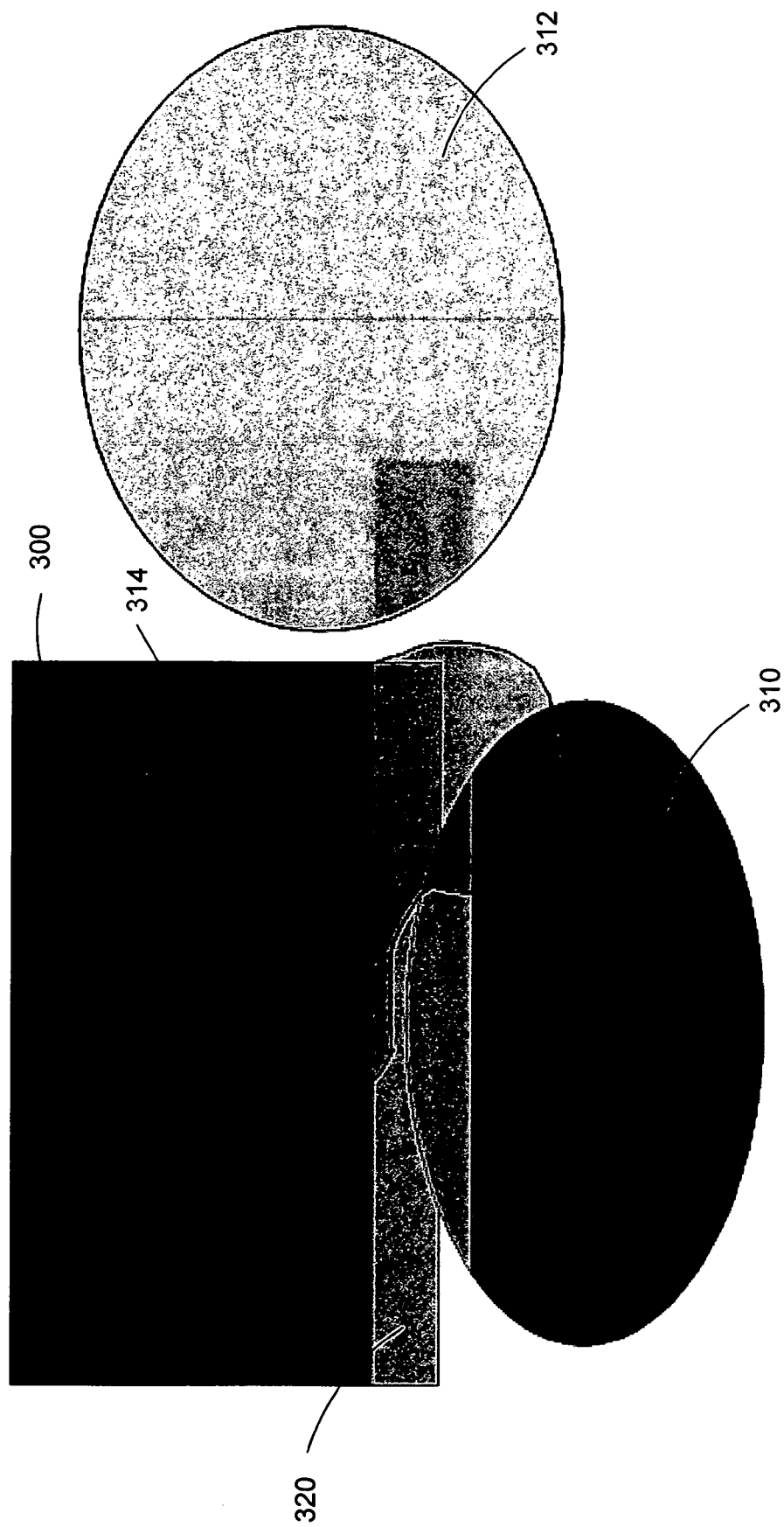
FIG. 3 illustrates an example of a solid color transparency.

FIG. 3 is an example of a transparency effect in Microsoft Word as it appears on a user display. FIG. 3 shows rectangular portions 300 and 320, oval portions 310 and 312, and an irregularly shaped portion 314. An opaque brush object can be used to paint the interior of any of the aforementioned graphic shapes. In FIG. 3, regions 310, 312, 320, and 314 appear to be transparent. Non-overlapping portions of the rectangular portion 300 are opaque.

However, as stated above, GDI, the native graphics API on the Windows operating system, does not support transparency in a brush natively. Because printing requires the use of GDI, this lack of support presents a major problem when applications need to print shapes having transparent portions.

Thus, with GDI operations, applications exercise one of several alternatives. Many applications simulate their shape filled with transparency with a set of GDI operations. Alternatively, applications such as GDI+ and Microsoft Office will determine if a selected printer is a postscript printer. If the printer is a postscript printer, the applications will bypass GDI and emit a postscript representation that supports transparency. However, this alternative requires the application to work in a device dependent manner and add special codes for particular devices. Accordingly, in practice, applications only exercise this option for postscript printers. Another alternative allows applications to apply transparency themselves and convert everything into a large image and send the image into a printer driver. This approach creates an image that has a much larger size than desired and the image will show rough edges in a zoomed view Thus, for printing, because of the drawbacks of other techniques as set forth above, many applications simulate their shape filled with transparency with a set of GDI operations. Typically, the shapes are simulated by a sequence of GDI operations that involves ROPs. A resulting image is illustrated in FIG. 4.

Figure 4:
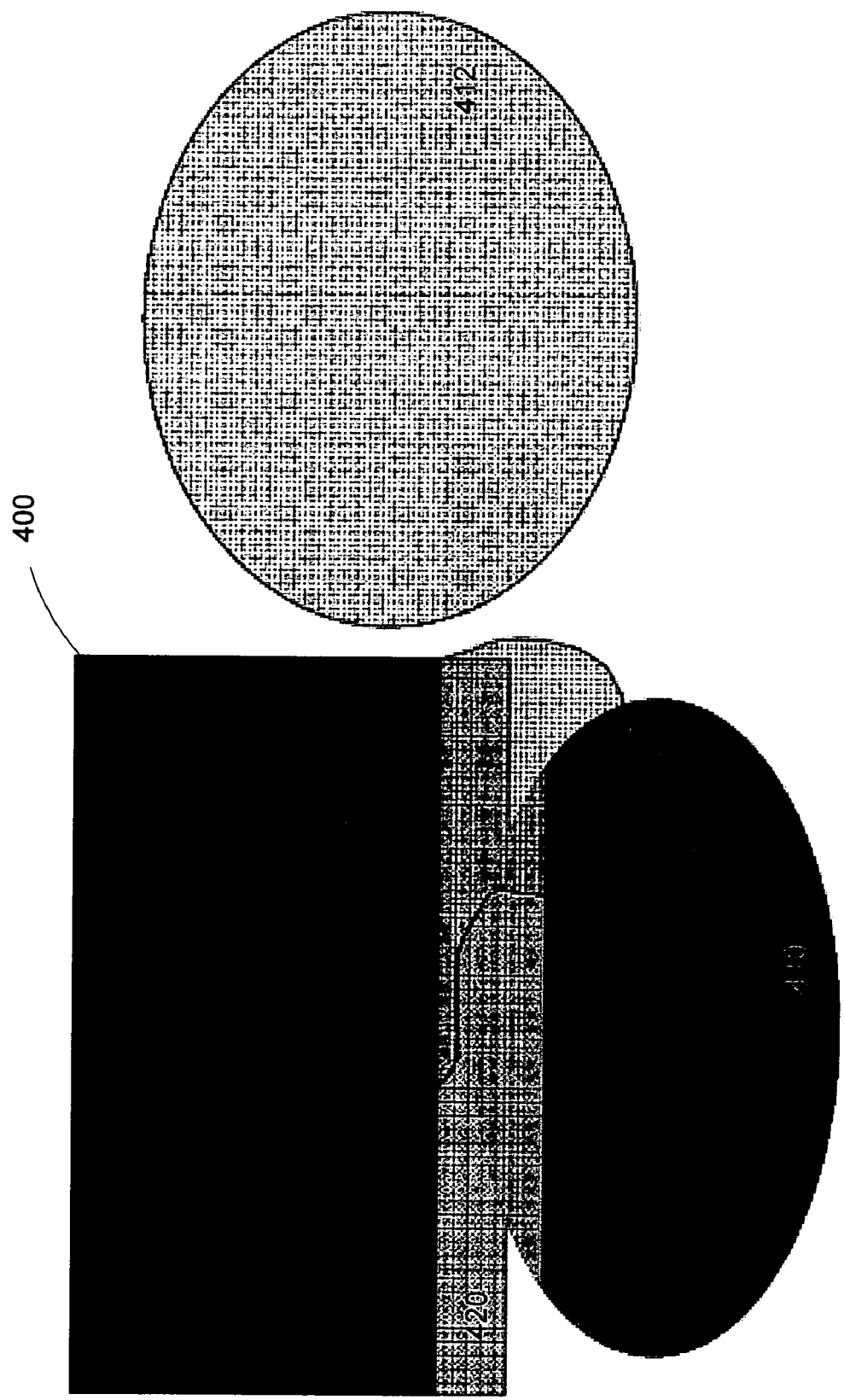
FIG. 4 illustrates a potential appearance of a GDI simulation.
Figure 5:
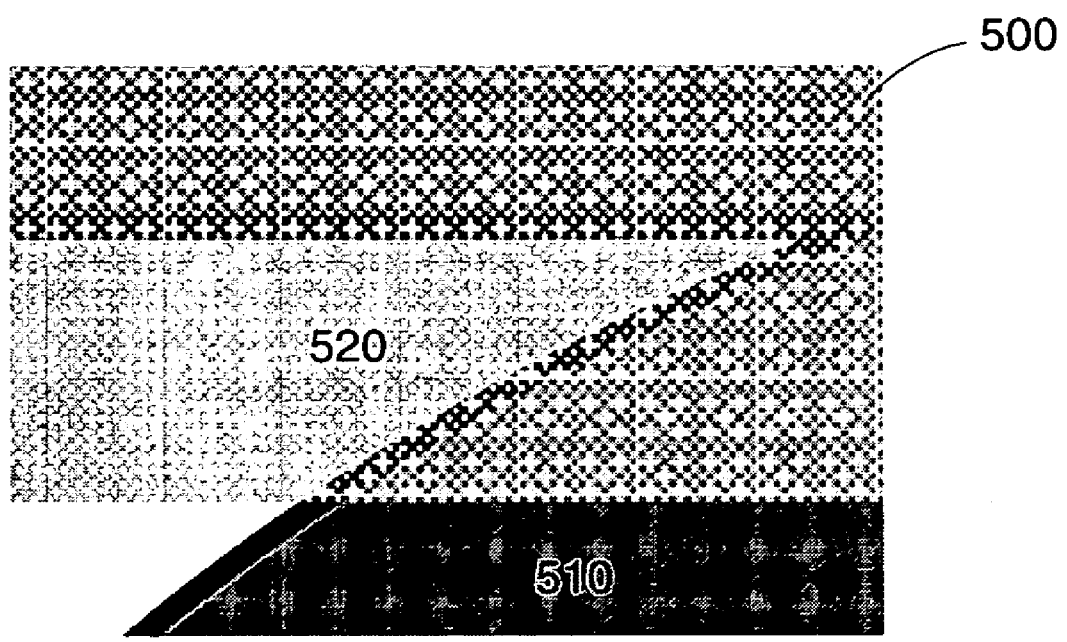
FIG. 5 illustrates a zoomed view of the GDI simulation shown in FIG. 4.

FIG. 4 includes the rectangular shapes 400 and 420, irregular shape 414, and oval shapes 410 and 412. However, an attempt to simulate transparency results in a grid-like appearance of all portions except the non-overlapping portion of the rectangular shape 400. This portion is the only opaque portion, whereas the other portions having the simulated transparency effect all appear undesirably grid-like. FIG. 5 additionally illustrates a zoomed in or close-up view that illustrates the problem more clearly with rectangular portion 500 and 520 and oval portion 510.

The simulation that results in the above-identified effects involves a series of steps. In a first step, the applications create a desired brush in GDI and select it. Subsequent steps require knowledge of binary raster operation codes that define how GDI combines bits. Each raster operation code represents a Boolean operation in which values of pixels in the selected pen and destination bitmap are combined. The operations and operands in Table 1 may be used.

TABLE 1

| Operand | Meaning |
| --- | --- |
| P | Selected pen |
| D | Destination bitmap |
| The Boolean operators used in these operations follow. | |
| Operator | Meaning |
| A | Bitwise AND |
| N | Bitwise NOT (inverse) |
| O | Bitwise OR |
| X | Bitwise exclusive OR (XOR) |

Boolean operations are presented in reverse Polish notation. For example, the operation DPo is equivalent to "D OR P" and replaces the values of the pixels in the destination bitmap with a combination of the pixel values of the pen and the selected brush.

Each raster-operation code is a 32-bit integer having a high-order word that is a Boolean operation index and a low-order word that is an operation code. The 16-bit operation index is a zero-extended 8-bit value that represents all possible outcomes resulting from the Boolean operation on two parameters (in this case, the pen and destination values).

In a second step, the applications apply the "PatBlt" function of the brush to a bounding rectangle of the transparency area using ROP value DPx, which is the same is D XOR P. The Patblt function paints a given rectangle using a currently selected brush. In this case, the operation mixes a destination pixel value (or surface color) with a pixel value on the brush using an XOR operation. The PatBlt function affects the bounding rectangle, which may cover a wider area than the actual transparency area. For example, if the transparency is a filled circle, this operation will affect a larger area. This coverage is offset by the sixth step described below.

In a third step, the application creates a binary mask brush with typical mask dimensions of 16×16 pixels or 8×8 pixels.

The application divides the number of white pixels by the total number of pixels to obtain a transparency ratio and selects an appropriate mask.

In a fourth step, the application fills the transparency area using the mask brush and ROP value DPa (D AND P). This operation mixes a destination pixel value with the pixel value on the brush with an AND operation. The fill operation depends on the shape of area. For a rectangle, the fill operation would be accomplished using the PatBlt function. For a circle, the fill operation would be accomplished using a "FillPath" operation. Several calls in sequence may be required.

In a fifth step, the application selects the solid color brush of the first step again. Finally, in a sixth step, the application uses the PatBlt operation with the brush on the bounding rectangle of the transparency area using DPx (D XOR P). As a result of the above-mentioned six steps, the transparency simulation shown in above results.

The six steps described above include a series of GDI calls that are translated to DrvXXX calls. In a display or printer driver, a number of DrvXXX functions are implemented by the driver in order to perform rendering operations. Some of the DrvXXX functions are displayed in Table 2 below.

TABLE 2

| Function | Purpose | May be used for path fill with transparency? |
|---|---|---|
| DrvCopyBits | Translates between device managed raster surfaces and GDI standard format bitmaps | Yes |
| DrvBitBlt | General bit block transfer | Yes |
| DrvStretchBlt | Provides stretching bit block transfer capabilities between any combination of device managed and GDI managed surfaces | Yes |
| DrvStrokePath | Outlines a path | Yes |
| DrvFillPath | Filling of closed paths | Yes |
| DrvStrokeAndFillPath | Outlines and fills path concurrently | Yes |
| DrvTextOut | Entry point from GDI that calls driver to render set of glyphs | No |
| DrvStretchBltROP | Performs a stretch bit block transfer using ROP | No |
| DrvPlgBlt | Provides rotate bit-block transfer capabilities between combinations of device managed and GDI managed surfaces | No |
| DrvGradientFill | Shades specified primitives | No |
| DrvTransparentBlt | Provides bit block transfer capabilities with transparency | No |
| DrvAlphaBlend | Provides bit block transfer capabilities with alpha blending | No |

GDI operations such as BitBlt and FillPath are handled by a graphics rendering engine (GRE) that calls DrvXXX operations implemented by graphics drivers.

IV. Detection and Conversion Process

A true (not simulated) transparent fill path has a number of properties. One of these properties is a path data property that describes the shape of the path. Another of these properties is a brush that describes the paint used to paint the interior of the shape. An additional property of a true fill path is an optional clip path that describes the clip region. Furthermore, a true fill path has an opacity value between 0.0 and 1.0. A value of 0.0 makes the brush completely invisible and everything under the shape is visible. A value of 1.0 makes the brush completely opaque.

In order to detect and handle transparency simulations, the transparency simulation detection system 10 saves the states of DrvXXX operations until it can determine whether each DrvXXX operation is part of a transparency simulation sequence. The node structure construction component 20 can save the state of each DrvXXX operation in a node object and place it in the node structure 26, which may be either a node queue, a list, or a tree structure. In a preferred embodiment of the invention, all DrvXXX operations for an entire page are inserted into nodes and placed into the list structure 26. The traversal components 30 process the node structure 26 at the end of a page.

In embodiments of the invention, a node structure named "PathFill" stores the state of DrvStrokePath, DrvFillPath, DrvStrokeAndFillPath. In addition, DrvBitBlt may also be represented as a "PathFill" when the parameters passed to DrvBitBlt meet certain conditions. In addition to general properties described above, this PathFill node contains a ROP property to store a raster operation value.

The traversal components 30 traverse the node structure 26 after it is constructed. The traversal components 30 detect the simulated path fill sequence. The conversion component 40 converts the simulated path fill into a true path fill with transparency.

Figure 6:
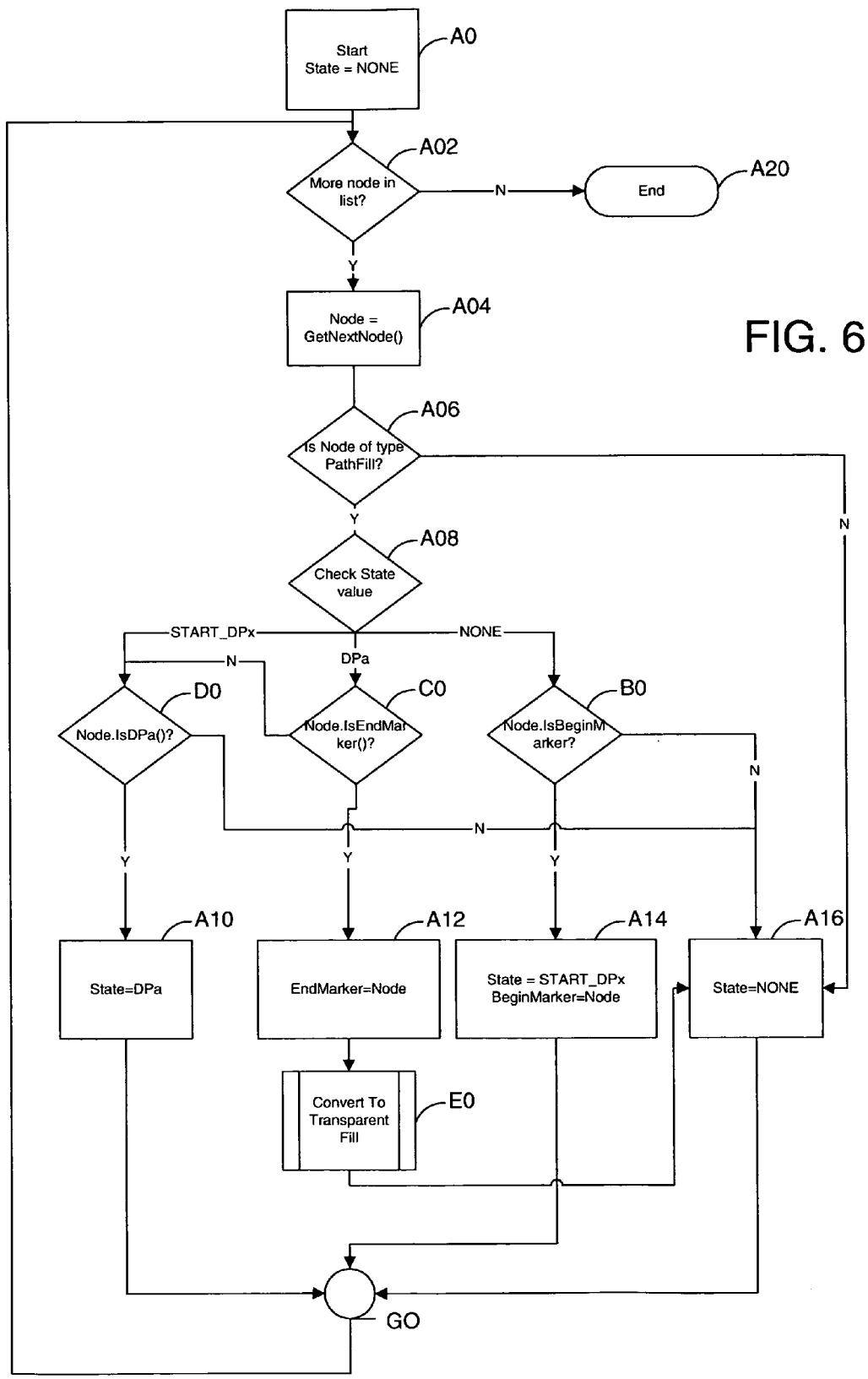
FIG. 6 is a flow chart illustrating a simulation detection and conversion technique in accordance with an embodiment of the invention.

FIG. 6 illustrates an embodiment of the traversal sequence. In step A0, traversal begins with a stored state equal to "none". In step A02, the traversal components 30 determine if additional nodes are present in the node structure 26. If no additional nodes are present in the structure in step A02, the process ends in step A20. If additional nodes exist in step A02, the traversal components get the next node in step A04. In step A06, the type check mechanism determines whether the node in question is of type Pathfill. If the node is not of type pathfill, the state is set equal to "none" in step A16. If the node in question is of type Pathfill, then the state checking mechanism checks the state value of the node in step A08.

If the state value is "none" in step A08, the system checks to determine if the node is a beginning marker in step B0. If the state value is DPa, then the state check mechanism determines if the node is an end marker in step C0. If the state is Start_DPx, then the system determines whether the node has a state value of DPa in step D0.

If the node does not have any of the state values of steps B0, C0, and D0, the state is set equal to "none". If the state value is DPa (D AND P) in step A10, the process ends in step G0. If the node is an end marker in step C0, the end marker is set equal to node in step A12 and the conversion mechanism performs a fill process at E0. The state is set equal to "none" in step A16 and the process ends or the next node is traversed.

If the node is a beginning marker in B0, the state is set equal to "Start_DPx" and the beginning marker is set equal to node. The next node is then traversed.

Figure 7:
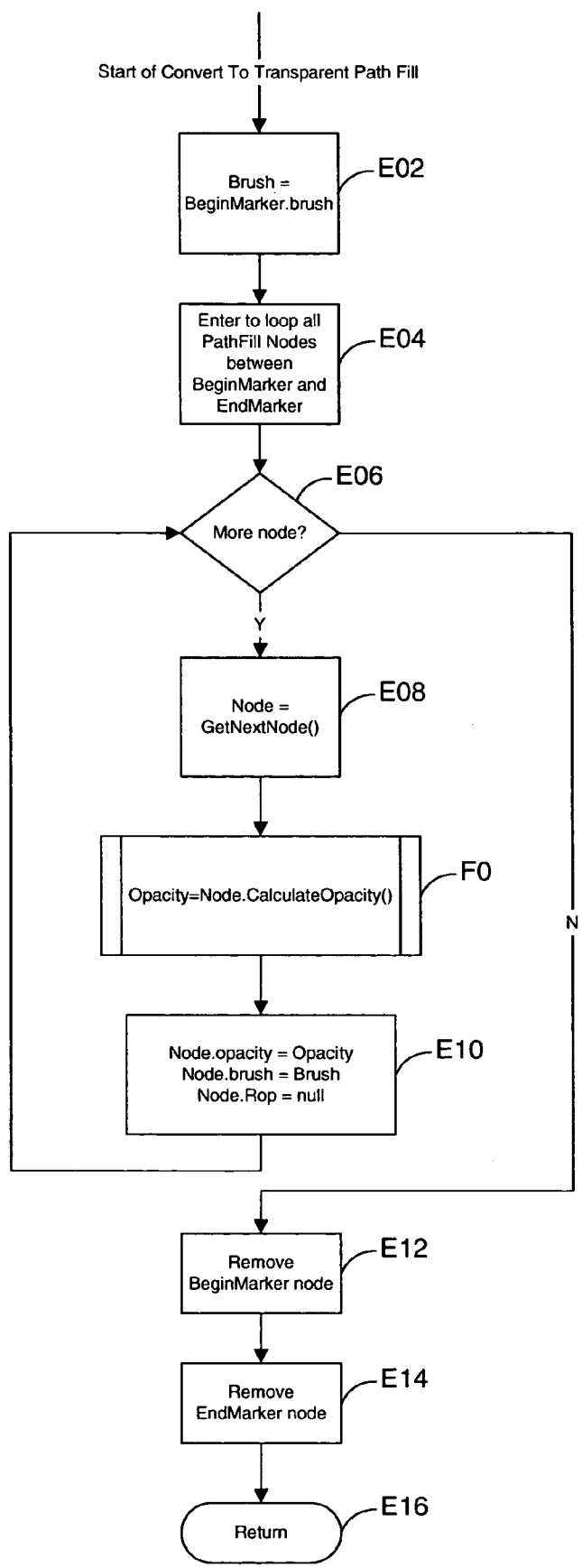
FIG. 7 is a flowchart illustrating a conversion process in accordance with an embodiment of the invention.

FIG. 7 illustrates the conversion process shown in step E0 of FIG. 6 in accordance with an embodiment of the invention. In step E02, the conversion mechanism sets the brush equal to the brush of the beginning marker. In step E04, the conversion mechanism loops between all pathfill nodes between the beginning marker and the end marker. In step E06, the conversion mechanism determines if there is another node. If there is not another node, the system skips to step E12.

If another node is present, in step E08, the conversion mechanism gets the next node. In process F0, the conversion mechanism calculates opacity. In step E10, the system sets the node opacity, brush and ROP. If no more nodes are present, the system removes the beginning marker node in step E12 and removes the end marker node in step E14. The process ends in step E16.

Figure 8:
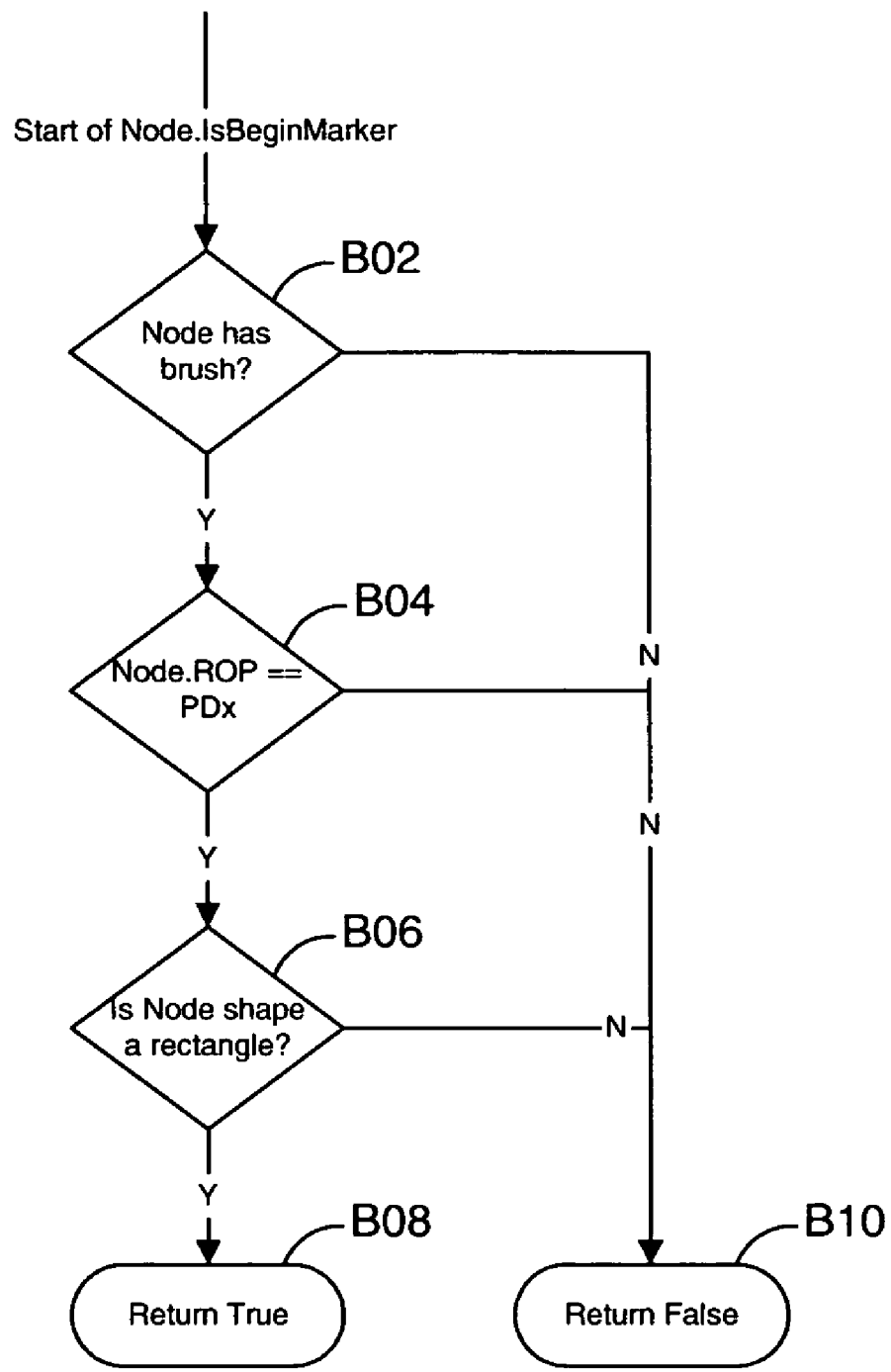
FIG. 8 is a flowchart illustrating further details of simulation detection in accordance with an embodiment of the invention.

FIG. 8 illustrates an embodiment of the process for determining if the node is a beginning marker as performed in step B0 of FIG. 6. In step B02, the state checking mechanism determines if the node has a brush. If the node does not have a brush, the system returns "false" in step B10. If the node does have a brush in step B02, the system determines if the ROP is PDx in step B04. If not, the system returns false in step B10. If the condition is true, the system determines if the node shape is a rectangle in step B06. If not, the system returns false. If the condition is true, the system returns "true" in step B08.

Figure 9:
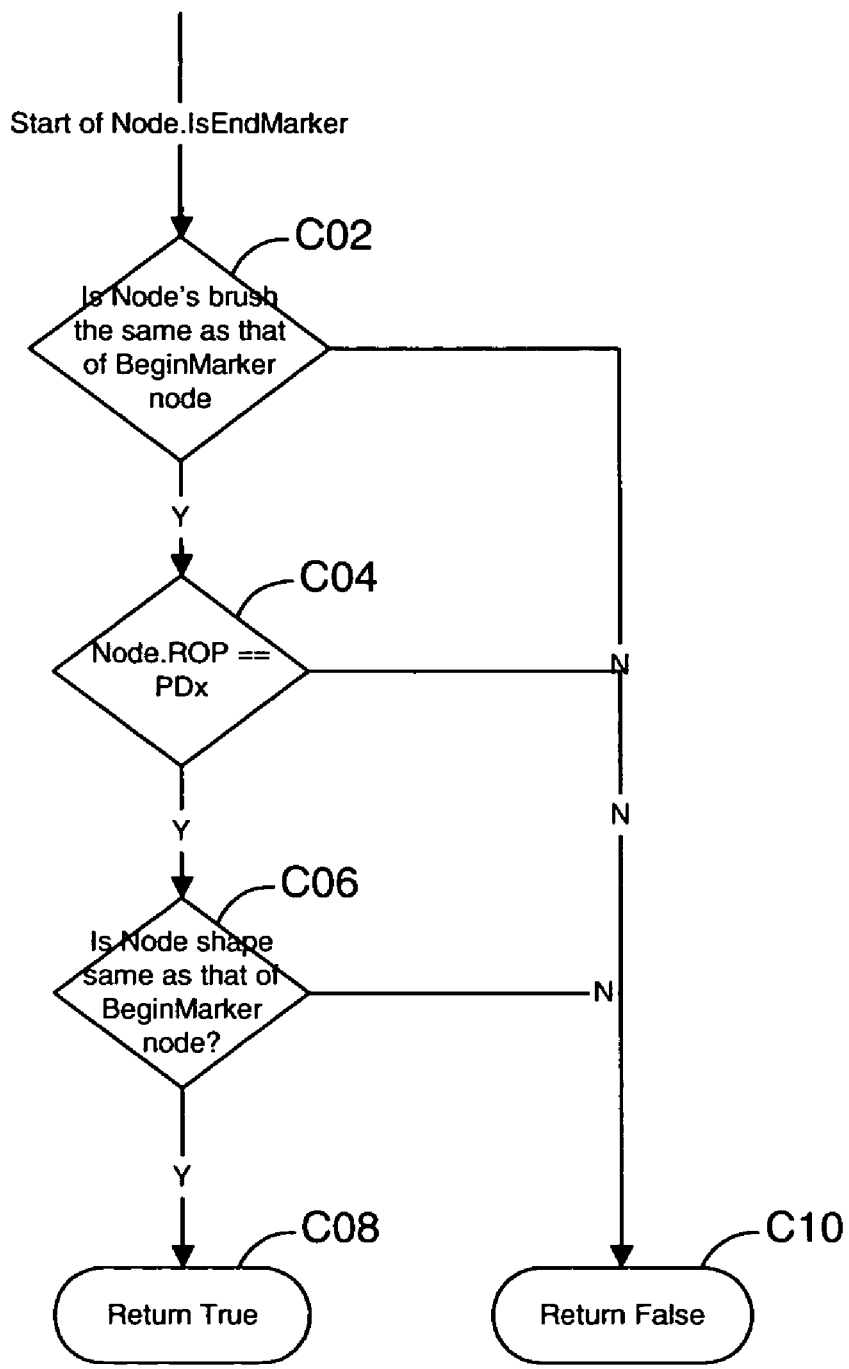
FIG. 9 is a flow chart illustrating additional details of simulation detection in accordance with an embodiment of the invention.

FIG. 9 illustrates a process for determining if a node is an end marker in accordance with step C0 of FIG. 6. In step C02, the system determines if the node's brush is the same as the brush of the begin marker. If not, the system returns false in step C10. If the condition is true, the system determines if ROP is equal to PDx in step C04. If the condition is false, the system returns false in step C10. If the condition is true in step C04, the system determines if the node shape is the same as that of the begin marker node is step C06. If not, the system returns false in step C10. If the condition is true, the system returns true in step C08.

Figure 10:
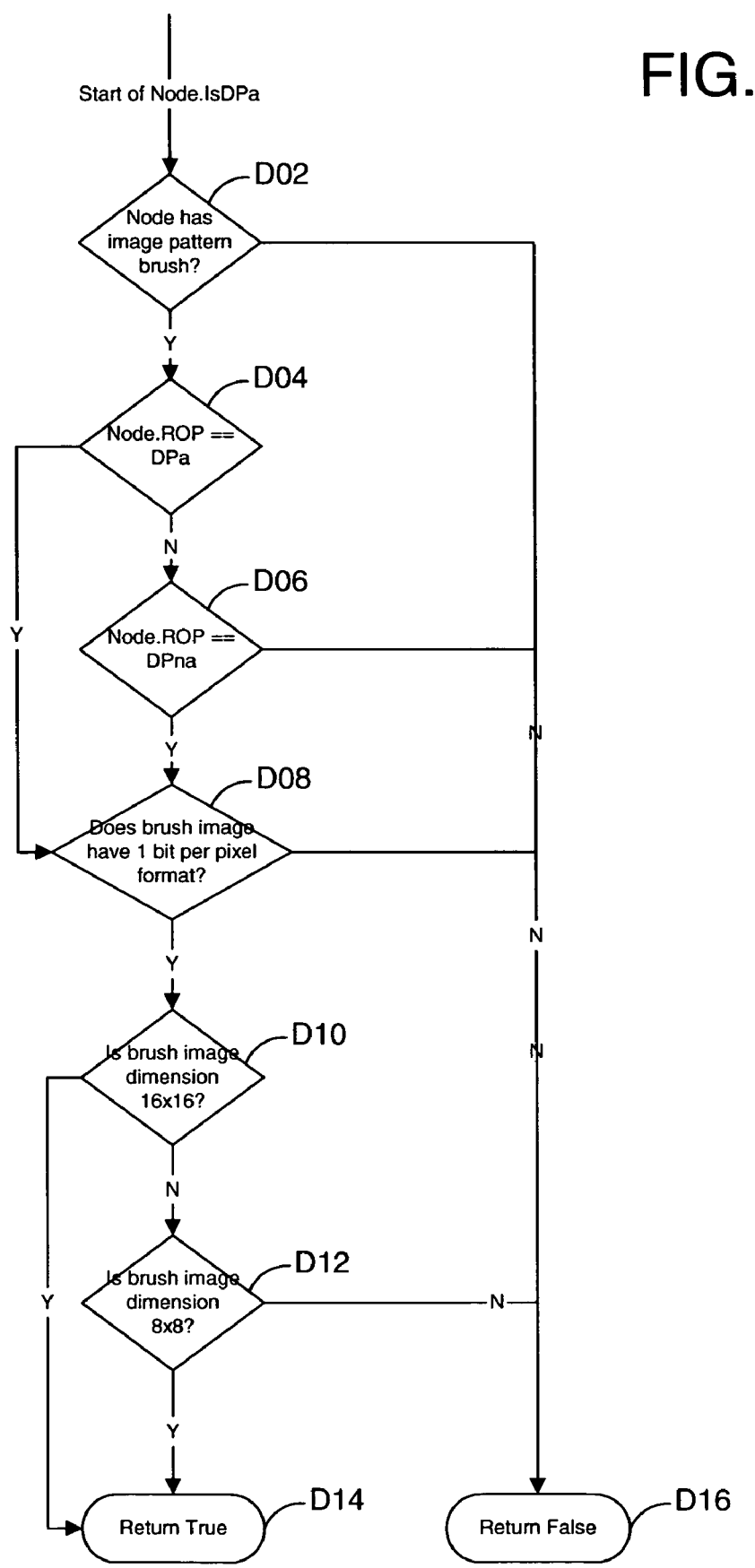
FIG. 10 is a flowchart illustrating additional details of simulation detection in accordance with an embodiment of the invention.

FIG. 10 illustrates a process for determining if a node has a state value of DPa as shown in step D0 of FIG. 6 in accordance with an embodiment of the invention. In step D02, the system determines if the node has an image pattern brush. If it does not, the system returns false in step D16. If the condition is true, the system determines if the ROP is DPa in step D04. If it is not, the system determines whether the node is DPna in step D06. If it is not, the system returns false in step D16. If the node has a value of either DPa or DPna, the system determines if the brush image has a one bit per pixel format in step D08. If it does not, the system returns false in step D16. If it does, the system determines in step D10 whether the brush image has a specified dimension such as 16×16 pixels. If not, the system determines if the brush image has an 8×8 pixel dimension in step D12. If the brush image has neither a 16×16 pixel nor an 8×8 pixel brush dimension, the system returns false in step D16. If the brush image dimension is either 16×16 pixels or 8×8 pixels, the system returns true in step D14.

Figure 11:
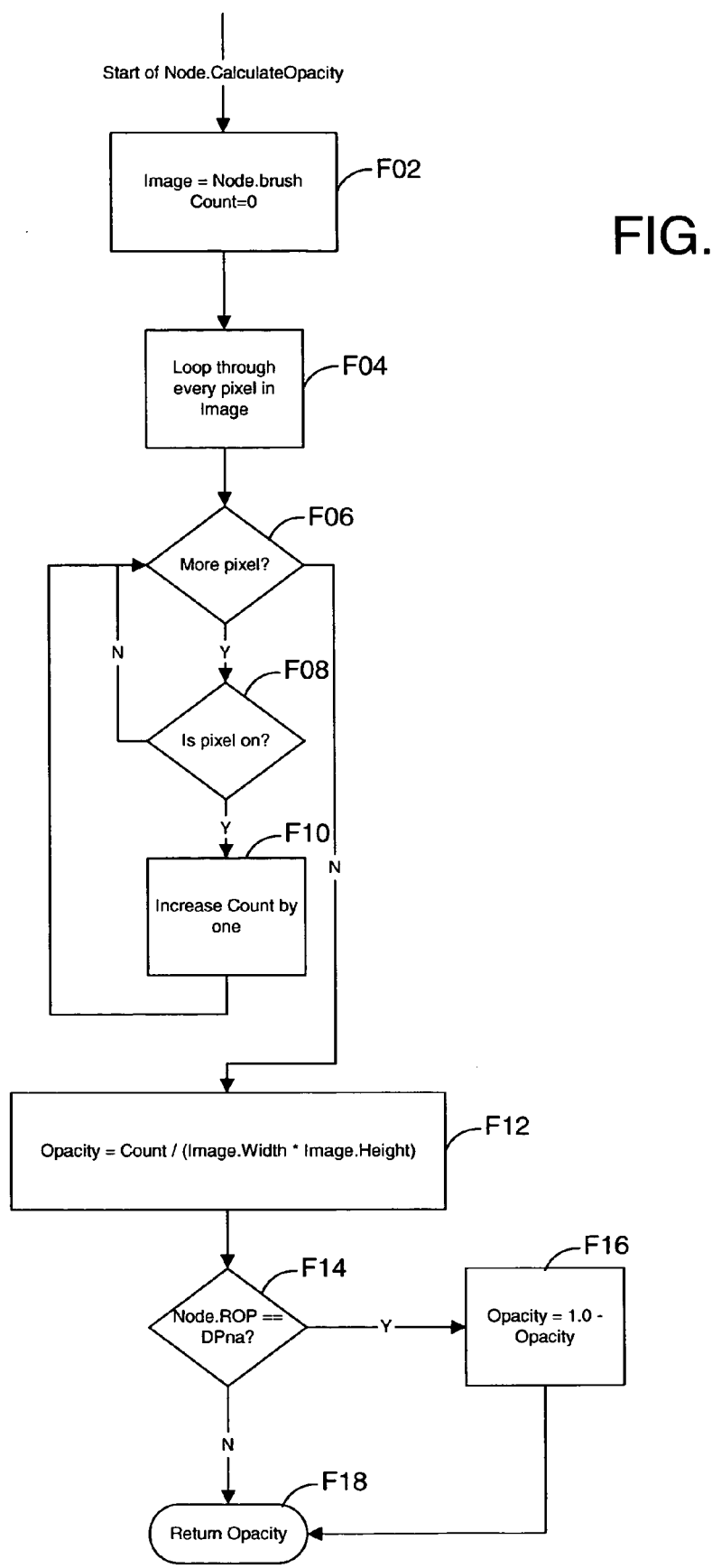
FIG. 11 is a flowchart illustrating further details of a conversion process in accordance with an embodiment of the invention.

FIG. 11 illustrates a process for calculating opacity for use by the conversion mechanism in accordance with an embodiment of the invention. In step F02, the system sets image equal to the brush for the node and sets the count equal to zero. In step F04, the system loops through every pixel in the image. In step F06, the system determines if more pixels exist. If another pixel is available in step F06, the system determines if the pixel is on in step F08. If not, the system looks for more pixels. If the pixel is on in step F08, the system increases the count by one in step F10.

When no more pixels are available in step F06, the system sets the opacity equal to "Count/(image.width×image.height) in step F12. In step F14, the system determines if the ROP is equal to DPna. If the condition is true the system sets the opacity equal to (1.0—opacity) and returns the opacity in step F16. If the condition is false, the system returns opacity in step F18.

Through the techniques of FIGS. 6–11, the system is able to detect a transparency simulation and convert a simulated transparency to a true transparency.

V. Other Simulation Processes

In addition to the transparency simulation process described above, other transparency simulations may be used to simulate transparency effects. One of them is the transparency mask effect. Some applications simulate the effect by breaking an image with a transparency mask into many single pixel images. Only opaque lines are drawn by calling DrvBitBlt or DrvStretchBltROP functions. The undesired effect is that the printer driver will get multiple single-line images for one such image. In an alternate detection process, the system of the invention can detect these adjacent single pixel height images and combine them back into a single image with an alpha channel, which is a transparency component of each pixel in an alpha bitmap.

VI. Conclusion

Thus, both printers and printer and display drivers can rely on the disclosed feature to properly convert documents containing transparency drawing objects into a corrected format such as a fixed XAML document. The technique can also be utilized by ordinary printers such ink jet printers.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for detecting a transparency simulation in a rendering device, the simulation formulated by an application, the method comprising:
   saving each drawing function in a node with an associated node type and node state;
   constructing a node structure from the saved nodes;
   traversing the node structure;
   determining the saved type of a saved node in the node structure;
   determining a state of the saved node if the saved type is a predetermined type; and
   detecting the transparency simulation upon finding the predetermined node type and a predetermined node state for the saved node.

2. The method of claim 1, wherein saving each drawing function comprises saving each DrvXXX function.

3. The method of claim 1, wherein the predetermined type is a path fill type.

4. The method of claim 3, wherein the predetermined state combines a selected pen with a destination bitmap using an AND operation.

5. The method of claim 4, further comprising performing a conversion process if the node type is the predetermined type, the node state is the predetermined state, and the node is an end marker.

6. The method of claim 4, further comprising determining if the saved node is an end marker and continuing traversal if the saved node is not an end marker.

7. The method of claim 1, further comprising proceeding to a next saved node if the saved node does not have the predetermined type.

8. The method of claim 1, further comprising re-setting a state value and proceeding to a next saved node if the saved node does not have the predetermined state.

9. A computer readable medium storing computer executable instructions for performing the method of claim 1.

10. A system for detecting transparency simulation formulated by an application, the system for operation in a rendering device and comprising:
a node structure construction component for saving each drawing function in a node with an associated node type and node state;
a node structure constructed from the saved nodes;
traversal components for traversing the node structure, the traversal components including a type check mechanism for determining a saved type of each node in the structure, and a state check mechanism for finding a saved state, wherein the traversal components detect the transparency simulation upon finding a predetermined node type and a predetermined node state.

11. The system of claim 10, further comprising a conversion component for converting a simulated transparency to a true path fill.

12. The system of claim 11, wherein the conversion component calculates node opacity and removes each begin marker and each end marker for converted nodes.

13. The system of claim 10, wherein the type detection mechanism seeks a path fill type as the predetermined node type.

14. The system of claim 13, wherein the traversal components continue to a next saved node if the type is not the predetermined type.

15. The system of claim 13, wherein the state detection mechanism seeks a state combining a selected pen with a destination bitmap using an AND operation as the predetermined state.

16. The system of claim 15, wherein the traversal components seek an end marker upon finding the predetermined state and the predetermined type.

17. The system of claim 16, wherein a conversion component converts the transparency simulation to a true path fill upon finding the predetermined state, the predetermined type, and an end marker.

18. The method of claim 15, wherein the traversal components continue traversal upon finding the predetermined state and the predetermined type without an end marker.

19. The system of claim 10, wherein the node structure construction component saves each DrvXXX function.

20. The system of claim 10, wherein the node structure is one of a list, a tree, and a queue.

* * * * *